March 6, 1956

J. R. NELSON 2,737,102

TRACTOR CULTIVATOR

Filed Dec. 14, 1951

James R. Nelson
INVENTOR.

BY Clarence A. O'Brien
and Harvey B. Jackson
Attorneys

United States Patent Office 2,737,102
Patented Mar. 6, 1956

2,737,102

TRACTOR CULTIVATOR

James R. Nelson, Carthage, Miss.

Application December 14, 1951, Serial No. 261,695

2 Claims. (Cl. 97—175)

The present invention relates to cultivators and more particularly relates to a cultivator hitch whereby the cultivator may be quickly and easily attached to a tractor or the like.

It is the principal object of the present invention to provide a cultivator hitch that fits directly into the slots on the implement carrying bars of tractors.

Yet another object of the present invention is to provide a cultivator hitch that permits an easy and simple adjustment of the teeth of the cultivator to drive them closer or further away from each other.

A still further object of the present invention is to provide a cultivator hitch that can be inserted and tightened without the user having to hold the attachment up while tightening the hitch.

The last object of the present invention to be mentioned specifically is the provision of a cultivator that may be attached to all Farmall tractors, all John Deere tractors and the large Allis Chalmers tractors without modification and which may be secured to other drawing vehicles with a minimum of modification.

These, together with various ancillary features and objects of the invention which will later become apparent as the following description proceeds, are attained by this device, a preferred embodiment of which is to be illustrated by way of example only in the accompanying drawings, wherein.

Figure 1:
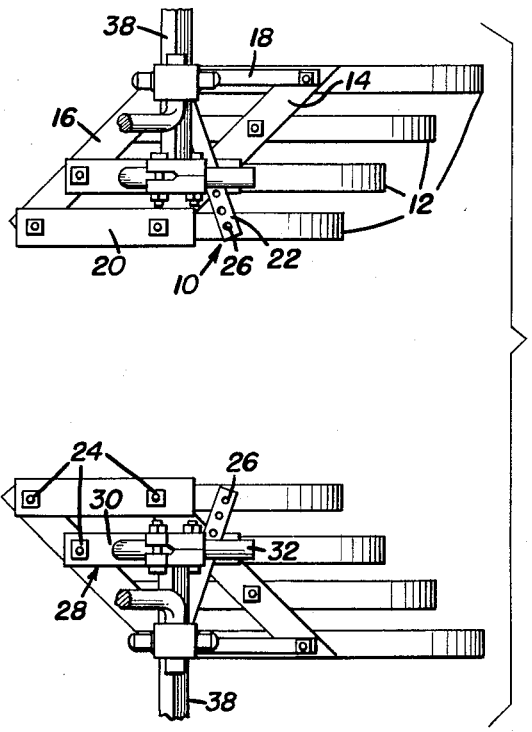
Figure 1 is a top view of a pair of cultivator units of the present invention operatively secured to the implement carrying bars of a tractor.

Referring now more specifically to the accompanying drawings wherein like numerals designate similar parts throughout the various views, attention is directed to Figure 1 showing a pair of cultivator units designated generally by the numeral 10 as they would appear from above when operatively connected to the implement carrying bars 38 of a tractor or other drawing vehicle. As shown in Figure 1, each of the cultivator units 10 is a gang cultivator including a plurality of cultivating implements or teeth 12 arranged side by side in laterally spaced relation. The teeth of each gang are arranged in the usual staggered relation to one another so that a pair of the gang cultivators 10 when attached to the implement carrying bars 38 of a tractor form a V-shape. Securing the cultivator teeth 12 in spaced relation are a pair of framing members 14 and 16. For convenience of description the frame member 14 will be referred to as the inner frame member and the frame member 16 will be referred to as the outer frame member. These members are disposed in spaced, parallel relation to one another and have cross braces 18 and 20 connecting their respectively adjacent ends. Cross brace 20, which is the inner brace, is shown as an angle member while cross brace 18, which is the outer brace, is shown simply as a strap. All of these members are secured to the cultivator teeth by conventional securing means 24 which are shown as bolt and nut fasteners. At the junction of the outer ends of frame member 16 and cross bar 18 is secured one end of an adjusting bar 22, which serves to retain and lock the cultivator implement carrying bars 14 and 16 in different swung positions. To accomplish this purpose, longitudinally aligned bolt holes 26 are provided in the other end of adjusting bar 22.

Figure 3:
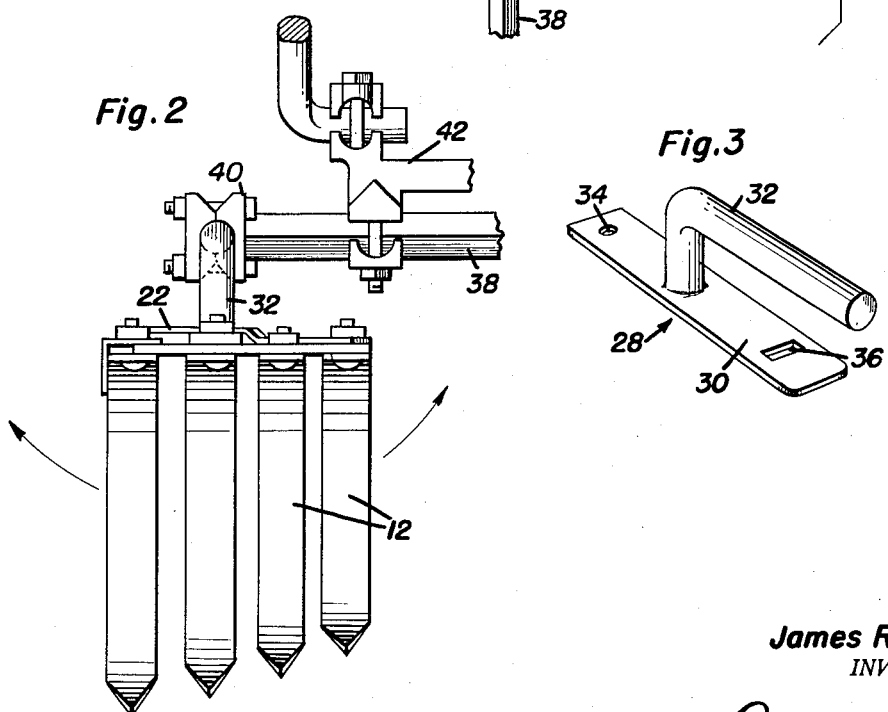
Figure 3 is a perspective view of the hitch per se.

Securing the cultivator units 10 to the implement carrying bars 38 are hitches indicated generally by the numeral 28. As shown clearly in Figure 3, each hitch comprises a flat, rectangular shaped, base portion 30 having an angulated handle 32 of substantially cylindrical shape secured thereto. It will be noted that adjacent one end of the base portion is provided an aperture 34 while adjacent the other end of the base portion is provided an aperture 36 in the shape of a transversely extending slot, the purpose of which will later be set forth in detail. The base portion 30 is secured at its ends to frame members 14 and 16 and extends generally parallel to and between cross members 18 and 20. Overlying the slot 36 of the base portion is an aperture 26 of adjusting brace 22 whereby the inner frame member, base portion and adjusting brace are secured to one another by a common fastener.

Figure 2:
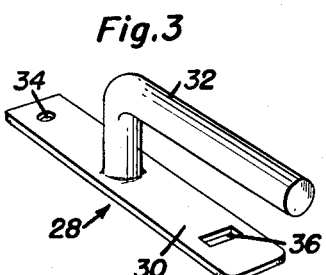
Figure 2 is a front view of one of the cultivator units shown in Figure 1.

Referring now to Figure 2, wherein is clearly shown the connection of the hitch 28 to implement carrying bar 38, attention is drawn to the clamping plates 40 at the inner end of implement carrying bar 38. The clamping plates 40 form a cuff or slot in which the handle 32 of the hitch is received. It is to be noted that the clamping plates 40 are conventional in design and form no part of the present invention. Upon loosening of the clamping plates, the cultivator may be tilted to the right or left as shown by the arrows in Figure 2 by rotation on the handle in the cuff. The tractor substructure supporting the implement carrying bar is designated in its entirety by the numeral 42 since a detailed explanation of this structure is not necessary for an understanding of the present invention.

Figure 4:
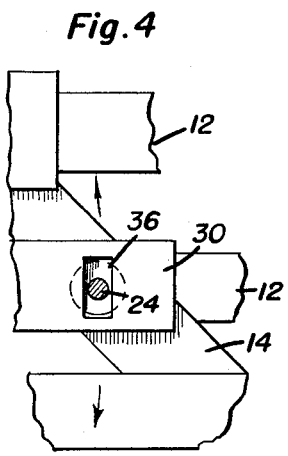
Figure 4 is an enlarged detail view showing the adjustable hitch connection to a cultivator unit.

In Figure 4 of the accompanying drawings, the purpose of slot 36 in the base portion of the hitch is clearly shown. The slot 36 of the base portion 30 overlies the inner frame member 14 and the fastener 24 secures them together; thus upon loosening of the fastener the cultivator may be moved to the right or left with respect to the hitch as is designated by the arrows appearing on Figure 4 of the drawings. Therefore, it is clear that minor adjustments of the cultivator teeth may be made easily and quickly without resort to either the adjusting brace or the cuff connection of the hitch.

The foregoing description will, it is believed, impart a clear understanding of the present invention and its operation to one in the art without further explanation.

However, since numerous modifications and changes will readily occur to those skilled in the art after a consideration of the foregoing specification and accompanying drawings, it is not desired to limit the invention to the exact construction shown and described, but all suitable modifications and equivalents may be resorted to falling within the spirit and scope of the appended claims.

Having described the invention, what is claimed as new is:

1. In combination with a cultivator having a plurality of teeth and a pair of spaced, parallel frame members securing said teeth in spaced relation to one another, a hitch secured to said spaced frame members, said hitch including an elongated, flat base plate extending between said frame members and being secured thereto adjacent its ends, a handle on said base plate for attaching said hitch to a drawbar, said handle being secured to said base plate intermediate the ends thereof, said handle being angulated and having a portion overlying and being substantially parallel to said base plate for securing the hitch to a drawbar clamp, said base plate being provided with a transversely extending slot adjacent one end, securing means extending through said slot, said securing means adjustably clamping said base plate to one of said frame members whereby the cultivator may be adjusted as a unit about an axis perpendicular to the base plate.

2. In combination with a cultivator having a plurality of teeth and a pair of spaced parallel frame members securing said teeth in spaced relation to one another, an adjusting brace secured adjacent one end of one of said frame members and extending diagonally across said other frame member for adjusting teeth relatively to one another, a hitch secured to said spaced frame members, a flat base on said hitch extending between said frame members and secured thereto adjacent its ends, said diagonal brace overlying a portion of said base, common fastening means securing said brace and said base to one of said frame members, said base having a transverse slot adjacent one end thereof, said fastening means extending loosely through said slot whereby the cultivator may be swung as a unit for a limited degree about said base.

References Cited in the file of this patent

UNITED STATES PATENTS

| | | |
|---|---|---|
| 130,337 | Tilden | Aug. 6, 1872 |
| 269,362 | Wilson | Dec. 19, 1882 |
| 847,868 | Wheeler | Mar. 19, 1907 |
| 1,100,512 | Ward | June 16, 1914 |
| 1,159,568 | Bush | Nov. 9, 1915 |
| 1,652,440 | Kipp | Dec. 13, 1927 |
| 1,690,525 | Best et al. | Nov. 6, 1928 |
| 2,413,467 | Patterson | Dec. 31, 1946 |
| 2,632,371 | Schoemaker | Mar. 24, 1953 |
| 2,632,372 | Williams | Mar. 24, 1953 |